Oct. 10, 1961 A. E. JOEL, JR 3,004,108

HIGH SPEED SIGNALING SYSTEM USING MAGNETIC STORAGE

Filed Sept. 17, 1956 3 Sheets-Sheet 1

INVENTOR
A. E. JOEL, JR.
BY S.E. Hollander
ATTORNEY

Oct. 10, 1961 A. E. JOEL, JR 3,004,108

HIGH SPEED SIGNALING SYSTEM USING MAGNETIC STORAGE

Filed Sept. 17, 1956 3 Sheets-Sheet 2

INVENTOR
A. E. JOEL, JR.
BY
S.E.Hollander
ATTORNEY

HIGH SPEED SIGNALING SYSTEM USING MAGNETIC STORAGE

Filed Sept. 17, 1956 3 Sheets-Sheet 3

INVENTOR
A. E. JOEL, JR.
BY S.E. Hollander
ATTORNEY

United States Patent Office 3,004,108
Patented Oct. 10, 1961

3,004,108
HIGH SPEED SIGNALING SYSTEM USING MAGNETIC STORAGE

Amos E. Joel, Jr., South Orange, N.J., assignor to Bell Telephone Laboratories, Incorporated, New York, N.Y., a corporation of New York Filed Sept. 17, 1956, Ser. No. 610,188
15 Claims. (Cl. 179—18)

This invention relates to telephone systems and more particularly to the transmission of signals originated by a calling subscriber to centralized locations in areas employing step-by-step type telephone switching apparatus. These signals may be utilized at the centralized location for switching and billing purposes.

Known systems, in which automatic billing features are incorporated in conjunction with step-by-step type telephone switches, are arranged to reconstruct digits dialed (and expended) by the subscriber in reaching an outgoing trunk to a centralized or tandem point. These reconstructed digits are stored in an outgoing sender in combination with subsequent digits dialed by the subscriber. Finally, all digits thus stored are transmitted to the tandem office. It is apparent therefore, that the local office, in certain systems, is required to provide full registration capacity for all digits which the subscriber may reasonably be expected to dial.

Some prior art arrangements necessitate the dialing of a prefix or directing code in addition to, and preceding, the called directory number. The additional digits comprising the directing code are required in order to route the call to a particular incoming trunk at a tandem location equipped to receive this type of call.

In view of the limitations imposed by these prior art arrangements, it is an object of this invention to transmit to a tandem location, signals dialed by a calling subscriber without the necessity of providing complete register capacity at the local office for all digits dialed.

An additional object of this invention is the transmission to a tandem location, of signaling information from a subscriber, without the utilization of a directing code or prefix to the called directory number.

A feature of this invention is the utilization of a magnetic shift register to temporarily store reconstructed code digits and subsequently dialed digits.

Another feature of this invention is a high speed direct-current signal receiver adapted to receive and register signals emanating from the magnetic shift register.

These and other objects and features may be accomplished by the use of a magnetic shift register at the local office and a high speed direct-current receiver at the tandem office location. The reconstructed code digits and a digit dialed into the trunk after seizure thereof are temporarily stored in the shift register. During dialing, the shift register is stepped along at dial pulse rate, and at a much higher rate during interdigital intervals. In consequence of the high speed outpulsing and relatively slow dial pulsing, the receiver at the tandem office rapidly overtakes the subscriber's dialing. Thus, the shift register need have storage capacity only for the digits to be reconstructed and an additional digit dialed into the trunk after seizure thereof. Later dialed digits are transmitted through the shift register and directly over the trunk to tandem.

The shift register is divided into two stages in order that the input end may be stepped without stepping the output end. Consequently, while awaiting connection of the receiver at the tandem office, the digit the subscriber dials is stored in the register behind the stationary reconstructed digits.

These and other objects and features of the invention may be more readily understood by an examination of the accompanying specification, appended claims and attached drawings in which:

GENERAL DESCRIPTION

In accordance with the invention, a subscriber OS, desiring a connection to a line terminating in an office in a toll area, by removing his receiver from the switchhook starts an idle line finder paired with a first selector in search of his line. As soon as the line is found, dial tone is transmitted. The subscriber then proceeds to dial the called directory number. In response to the dialing of one or more of the office code digits, the selector switches of a switching train are operated to extend a connection from the calling line to an outgoing trunk, over which trunk a connection may be further extended to a tandem office in which a trunk to the terminating local office is connected.

Following the seizure of the trunk, an idle sender in the tandem office to which said trunk is connected, is energized. The sender is provided with registers for registering the digits of the directory number dialed by the calling subscriber. To eliminate the possibility that a digit dialed by the subscriber might be lost during the time elapsing between the seizure of the trunk and before the idle sender becomes associated with the trunk, a magnetic shift register stage for registering a digit following the last code digit dialed to reach the trunk, is provided. Since the trunk may be seized in response to one, two or three code digits, the trunk digit register may record the second or third code digit or the first directory number digit. In addition, the shift register includes storage capacity for storing the reconstructed code digits representing those expended in reaching the trunk.

When the tandem incoming sender is connected, a supervisory signal is sent from the tandem office to the local office to indicate readiness for pulse reception. At this time the two parts of the magnetic shift register are serially connected and the dialed information passes through the shift register at dialing speed during dial pulsing and at a much greater speed during the interdigital intervals. The digits are impressed on the trunk loop by a pulse transmitter controlled by the shift register. A detecting circuit in the tandem incoming sender comprising a gas stepping tube is responsive to the signals conveyed over the trunk loop.

When the tandem sender has received the digits required to complete the call, it sends another supervisory signal to the local office to dismiss the pulse transmitter, and connects to the tandem marker. The connection to the appropriate tandem outgoing trunk is made by the marker and the informtion stored in the incoming sender is transmitted over the trunk to the terminating local office to effect a connection to the called party CS.

DETAILED DESCRIPTION

*Seizure of outgoing portion of trunk circuit in local office*

Figure 1:
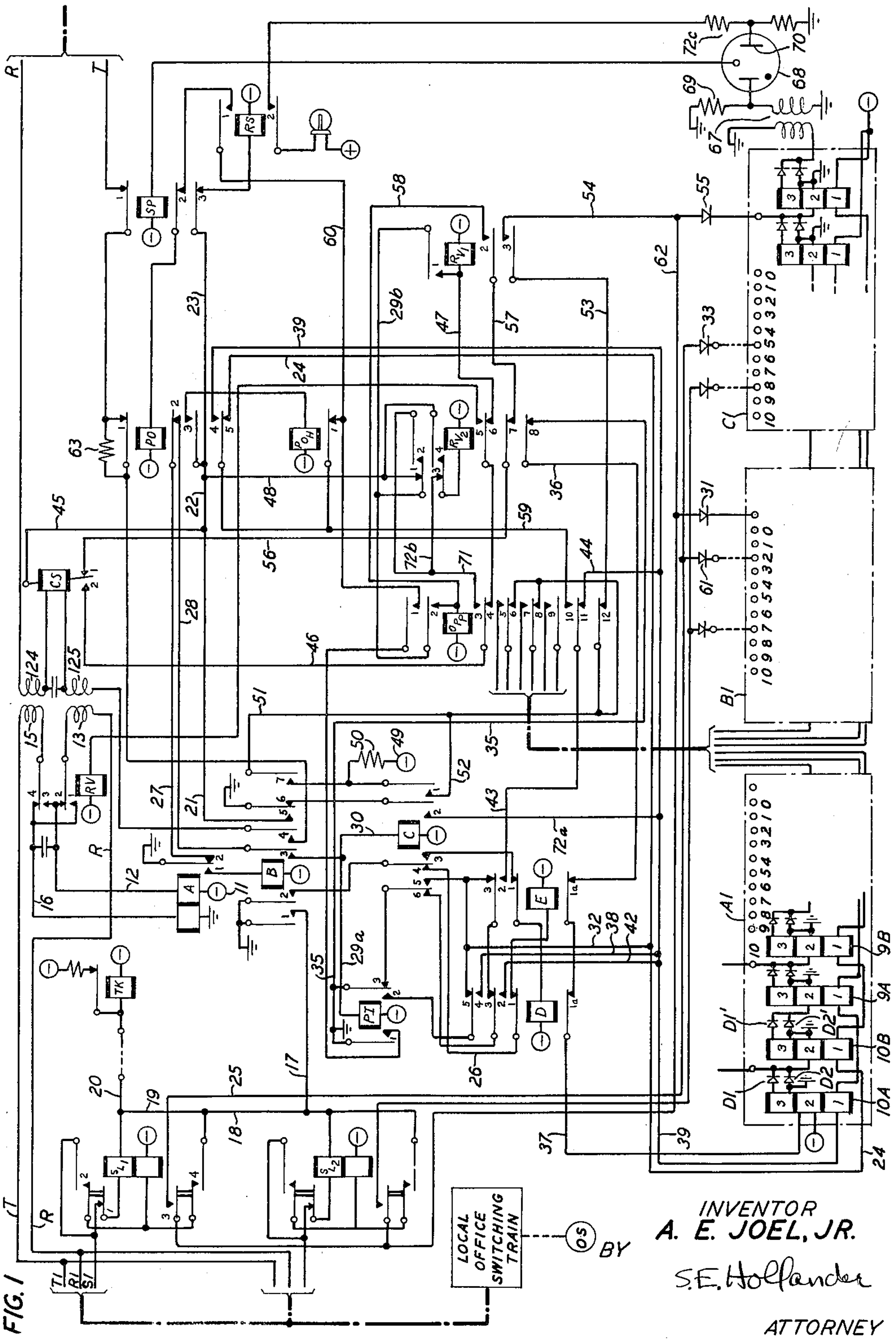
FIG. 1 is a circuit illustrating the local office portion of an exemplary embodiment of the present invention, including the magnetic shift register and high speed decimal direct-current outpulsing device.

When the trunk circuit in FIG. 1 is seized by a selector (not shown) over leads T1, R1 and S1, in response to dialing signals by the subscriber OS, relays A, B, SL1, RS and TK operate. Relay A operates over a path from battery 11, right operating winding of relay A, conductor 12, No. 2 contacts of relay RV, coil 13, conductor R, conductor R1, through preceding selector switches (not shown) and the subscriber's loop and back over conductor T1, conductor T, coil 15, No. 4 contacts of relay RV, conductor 16, left operating winding of relay A to ground. Relay A operates in response to each line closure and releases in response to each line open condition.

The operating path for relay B may be traced from ground, No. 1 contacts of relay A, winding of relay B to negative battery. Relay B is a slow release relay and operates once on each call. Relay SL1 operates over a path from ground, No. 1 contacts of relay B, conductor 17, conductor 18, conductor 19, upper winding of relay SL1, No. 1 transfer contacts of relay SL1, to conductor S1 and negative battery at the preceding switch (not shown). A holding path for relay SL1 and preceding switches in the train may now be traced from ground, No. 1 contacts of relay B, conductor 17, conductor 18, No. 4 contacts of relay SL1, No. 2 contacts of relay SL1 to the sleeve conductor S1 and preceding switches as described, and through the lower winding of relay SL1 to negative battery.

The operating path for relay TK may be traced identically with that of relay SL1 above and continuing over conductor 20 through the winding of relay TK to negative battery.

Relay RS operates as a result of the operation of relay B over a path from ground, No. 5 contacts of relay B, conductor 21, conductor 22, conductor 23, No. 3 contacts of relay SP, winding of relay RS to negative battery. Relay E also operates at this time over a path which may be traced from ground, No. 2 contacts of relay B, No. 4 contacts of relay C, conductor 26, No. 1 contacts of relay D, through the winding of relay E to negative battery.

The trunk loop T and R to the tandem office is closed through the closure of the No. 4 contacts of relay B over a circuit including coil 124, winding of relay CS, coil 125, No. 4 contacts of relay B, No. 1 contacts of relay PO and the No. 1 contacts of relay SP. In response to the closure of the trunk loop, the incoming trunk in the tandem office (FIG. 2) initiates connection of an incoming sender in the usual manner. Reference may be made to Patent No. 2,281,636, granted May 5, 1942, to W. B. Strickler and to the patents therein referred to for a complete description of the tandem office portion of the system not shown in detail herein.

*Connection of direct-current receiver at tandem office*

At the tandem office (FIGS. 2 and 3) a pulse detecting and counting circuit including a gas stepping tube of the type described in Patent No. 2,575,370 to M. A. Townsend on November 20, 1951, is utilized. When the loop to the tandem office is closed through the No. 4 contacts of relay B, relays SUP and GP of FIG. 3 operate over a circuit from ground through winding 88 of relay GP, dial tone coil 89, pulse repeat coil 90 over the trunk loop and return through pulse repeat coil 91, dial tone coil 92, winding 93 of relay GP, winding of relay SUP and negative battery. In operating, relay GP, at its No. 1 contacts, closes a circuit through winding 95, which produces a flux opposing that created by the operating windings 88 and 93 to permit a higher degree of sensitivity in release of relay GP. Operation of relay SUP results in the operation of relay SR, a slow release relay, over a path from ground, contacts of relay SUP, resistance 94, operating winding of relay SR to negative battery.

Figure 3:
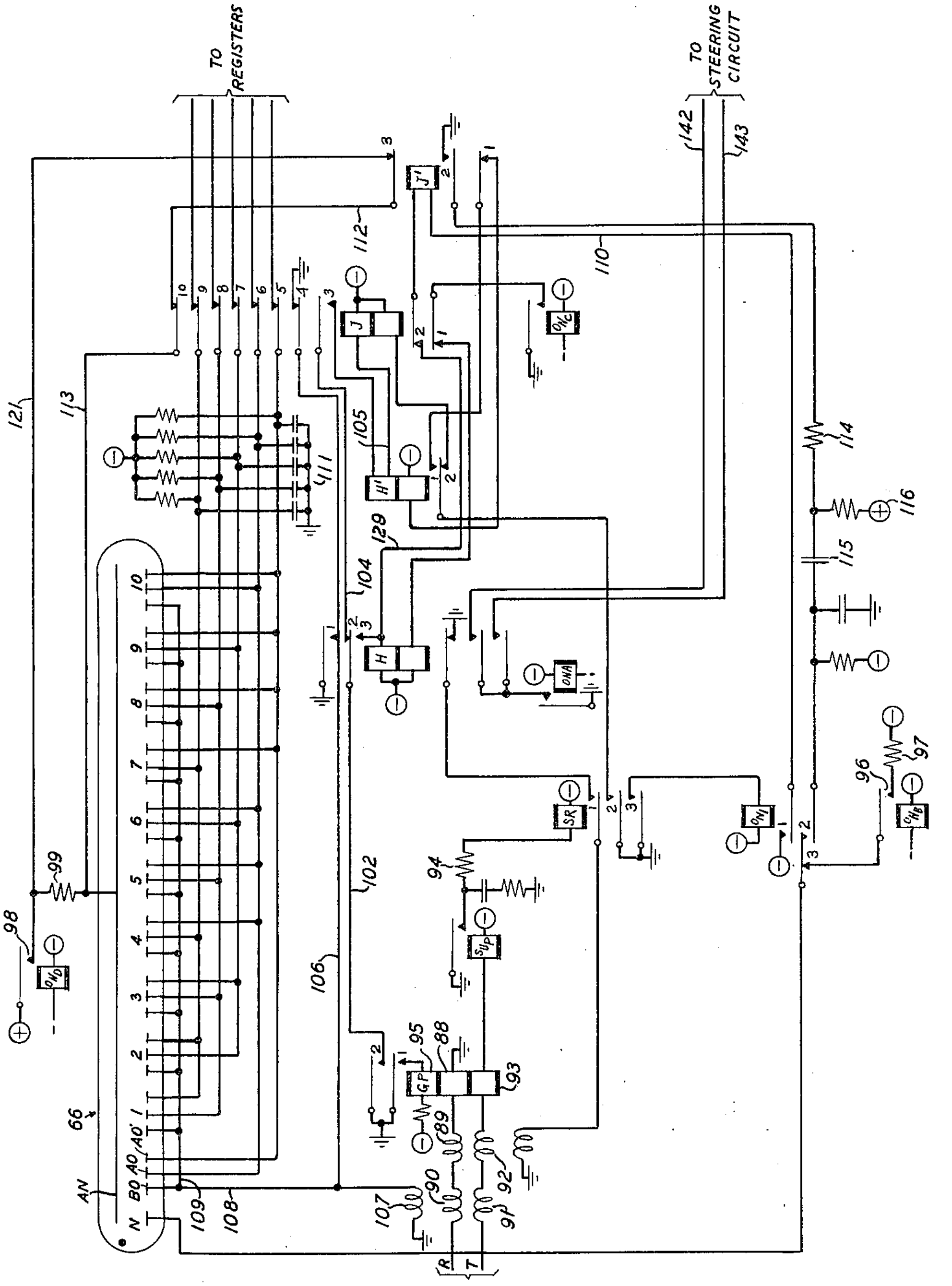
FIG. 3 shows the details of the high speed direct-current receiving apparatus in the sender at the tandem office shown in block outline in FIG. 2.

Prior to the operation of relays GP and SUP, relays ONA, ONB, ONC and OND of FIG. 3 are energized by off-normal contacts in the sender circuit, when the circuit is seized, by means not shown herein. As a result, contacts 96 of relay ONB are closed, placing a negative potential on cathode N of the stepping tube over a path from negative battery, resistance 97, contacts 96 of relay ONB, No. 3 transfer contacts of relay ON1, to cathode N. The anode AN of the stepping tube has a positive potential impressed thereon from positive battery, contacts 98 of relay OND, resistance 99 to the anode of the gas stepping tube 66. In consequence of the voltage developed therebetween, a discharge path is formed between cathode N of the gas stepping tube and the anode AN thereof.

The operation of relay SR, referred to above, results in the operation of relay ON1 through the closure of the No. 3 contacts of relay SR. Relay H operates over a circuit from ground, contacts of relay ONC, conductor 108, No. 1 contacts of relay J, lower operating winding of relay H to negative battery. In operating, relay H locks up over its upper winding through a circuit including No. 3 contacts of relay H, conductor 102, No. 2 contacts of relay GP to ground.

Relay J operates from ground, No. 2 contacts of relay SR, No. 2 contacts of relay H', through the lower operating winding of relay J to negative battery.

*Storage of digit dialed during connection of sender*

While the sender is being connected, the subscriber may dial an additional digit thereby causing relay A of FIG. 1 to release a number of times equal to the decimal value of the digit. Relay PI operates on each release of relay A over a path from ground, No. 2 contacts of relay A, conductor 27, No. 2 contacts of relay PO, conductor 28, No. 3 contacts of relay B, conductor *29a*, winding of relay PI to negative battery. Relay C, a slow release relay, operates on the first release of relay A over a path from ground, No. 2 contacts of relay A, Conductor 27, No. 2 contacts of relay PO, conductor 28, No. 3 contacts of relay B, conductor 30, winding of relay C to negative battery.

When relay PI operates with relay D in the released or normal condition, lead 24 into the shift register is grounded momentarily, thereby advancing information in the input part A1 of the delay line. The path for the energization of conductor 24 extends from ground, No. 2 contacts of relay PI, No. 5 contacts of relay D, conductor 32, to lead 24.

At this point it may be well to consider the operation of the magnetic shift register before continuing with the description of the digit storage operation. The magnetic shift registers A1, B1 and C1 of FIG. 1 are shown only in sufficient detail to contribute to an understanding of the present invention. For a comprehensive disclosure of the type of magnetic shift register or delay line suitable for use in conjunction with the present invention, reference may be made to an article entitled "Magnetic Delay-Line Storage" by An Wang, Proceedings of the I.R.E., April 1951 at page 401.

Each of the sections A1, B1 and C1 of the shift register includes a capacity for 12 items of information. Since in this configuration two cores are used for each information "bit," a total of 24 cores is included within each register section. Each of the cores is understood to have a rectangular hysteresis loop of high coercive force and includes shift winding 1, input winding 2 and output winding 3. Each magnetic core is capable of being magnetized to saturation in either of two states; one of the states then persists for an indefinite period in consequence of the high retentivity of the core or until a magnetic force in an opposite direction is applied to the core. In the embodiment illustrated it will arbitrarily be assumed that a negative state is one in which the direction of retentivity is that which would result from the application of a shift or advance pulse to the shift windings 1 and a positive state is the same as that resulting from the application of a pulse to winding 2.

Rectifiers, such as D1 and D2, are inserted between the output winding of each core and the input winding of the succeeding core to isolate the effects of core action upon an adjacent core.

Assume, in the first instance, that all of the cores are in the negative magnetic state, a condition which may be obtained by applying advance pulses to the shift windings 1 over leads 39 and 24. Thus, initially a negative magnetizing force exists in each of the cores. If an input pulse is applied to core 10A over lead 37, thereby driving said core in the positive magnetic direction, a relatively large change of flux is exhibited by said core. This flux induces a voltage in winding 3 of core 10A which will tend to induce current flow that will be blocked by diodes D1 and D2. Subsequently, a shift pulse applied to winding 1 of core 10A over lead 39 will tend to return said core, and all other cores through which conductor 39 passes, to the negative magnetic saturation condition. In so doing, the relatively large change in flux produced in core 10A will induce a current in winding 3 which will travel from ground through winding 3 of core 10A, diode D1, winding 2 of core 10B to ground. This current will produce a flux in core 10B driving said core to the positive saturation condition. Thus, current will be induced in winding 3 of core 10B but will be blocked from flowing by diodes D1′ and D2′, thereby isolating the effects of the change of the core's magnetic state.

To further advance the information contained in core 10B to core 9A, an advance pulse is applied to conductor 24 which traverses the shift windings 1 of cores 10B, 9B, etc. This advance pulse reconditions core 10B to the negative magnetic state, inducing in the winding 2 of core 10B a current (which traverses a similar path to that previously described for core 10A) which flows through winding 2 of core 9A, thereby establishing a positive saturation condition in core 9A and returning core 10B to the negative magnetic state. Currents induced in core 9A are isolated from interference with adjacent cores by the diodes connected to said core.

In this manner, by alternately energizing conductors 39 and 24, information stored in any portion of the shift register is successively advanced through all the cores of the register.

Sections B1 and C1 of the register include facilities for reading information directly into said register as a means of reconstructing the code digits which the subscriber dialed and expended in reaching the outgoing trunk portion of FIG. 1. It will be noted that No. 3 contacts of relay SL1 control a path over conductor 25 to sections B1 and C1 of the magnetic shift register. Conductor 25 is connected to core terminal 2 of section B1 through diode 61 and is also connected to core terminal 5 of section C1 through diode 33. This illustrates a modified form of the so-called "point of seizure" method of code reconstruction wherein the digits to be reconstructed are related to the point at which the trunk has been seized by a selector. No. 3 contacts of relay SL1, in effect, indicate that the trunk has been seized by a selector associated with relay SL1 which has been operated in response to the dialing of decimal digits 5 and 2. Similarly, it may be shown that if relay SL2 were operated in response to the seizure of the trunk circuit by the selector associated therewith, the digits to be reconstructed and stored in the delay line will be decimal digits 8 and 7.

Continuing the detailed description, the operation of relay C of FIG. 1, at its No. 4 contacts, opens the operating path of relay E. When relay E has fully released an operating circuit for the energization of relay D is completed from ground, No. 2 contacts of relay B, No. 3 contacts of relay C, No. 1 contacts of relay E, through the winding of relay D to negative battery. During the interval which obtains prior to the operation of relay D, that is when relays D and E are both released, conductor 37 to the shift register is momentarily grounded, recording the mark at the beginning digit in the first position of the shift register. The path for the energization of conductor 37 may be traced from ground at relay PI, conductor 35, No. 8 contacts of relay RV2, conductor 36, No. 1A contacts of relay E, No. 1A contacts of relay D, conductor 37 to the magnetic shift register.

When relay D operates, it completes a path for energizing conductor 39 from ground, No. 2 contacts of relay PI, No. 4 contacts of relay D, conductor 38, conductor 39 to the magnetic shift register.

When relay A operates at the end of the first pulse, relay PI releases and grounds lead 24 of the shift register through the No. 3 contacts of relay PI, No. 5 contacts of relay C, conductor 32, to lead 24 at the magnetic shift register.

Continued advance of the shift register information proceeds as described above with alternate grounding of conductors 39 and 24 at the beginning and end of each dial pulse, respectively.

At the end of pulsing of the first digit, i.e., the interdigital interval, relay C releases (when the No. 2 contacts of relay A remain open), preparing a path for the release of relay D. Prior to the release of relay D, however, lead 39 is momentarily grounded to step the information in the register, over a circuit including ground, No. 3 contacts of relay PI, No. 6 contacts of relay C, No. 2 contacts of relay D, conductor 42, conductor 39 to the magnetic shift register. The release of relay D results from the opening of the No. 3 contacts of relay C.

When both relays D and E are released, conductor 37 to the magnetic shift register is momentarily grounded to mark the end of a digit in the delay line, over a path including ground at relay PI, conductor 35, No. 8 contacts of relay RV2, conductor 36, No. 1A contacts of relay E, No. 1A contacts of relay D, to lead 37 and the magnetic shift register. In time coincidence with the operation just described, lead 24 of the shift register is grounded through the No. 3 contacts of relay PI, No. 6 contacts of relay C, No. 3 contacts of relay D, No. 3 contacts of relay E, conductor 32 to lead 24 and the magnetic shift register.

The release of relays C and D prepares a path for the operation of relay E from ground, No. 2 contacts of relay B, No. 4 contacts of relay C, conductor 26, No. 1 contacts of relay D through the winding of relay E to negative battery. The operation of relay E causes a transfer of the ground condition from lead 24 to lead 39 thereby advancing storage pulses to the "B" cores in the register. Ground is applied to lead 39 from ground, No. 3 contacts of relay PI, No. 6 contacts of relay C, No. 3 contacts of relay D, No. 2 contacts of relay E, conductor 43, No. 11 contacts of relay OPP, conductor 44, conductor 39 to the magnetic shift register. The interruption of the ground condition on lead 24 to the magnetic shift register is occasioned by the opening of the No. 3 contacts of relay E, upon operation of said relay.

*Reconstruction of digits dialed to reach trunk*

When the tandem sender is connected at the tandem office a supervisory signal, in which the trunk polarity is reversed, is transmitted from the tandem office to the local office by means, in the sender, not shown herein as not essential to an understanding of the present invention. Reference may be made to Patent No. 2,594,014 to W. T. Haines and J. B. Newsom of April 22, 1952, and the patents referred to therein for a detailed explanation of this type of supervisory signaling. The reversal of trunk polarity causes polarized relay CS in the trunk loop to operate over an obvious circuit. Relay RV1 operates as a result of the operation of relay CS over a path from ground, No. 5 contacts of relay B, conductor 21, conductor 45, No. 2 contacts of relay CS, conductor 46, No. 4 contacts of relay OPP, No. 6 contacts of relay RV2, conductor 47, winding of relay RV1 to negative battery. The operation of relay RV1 prepares a locking circuit for that relay from ground, No. 5 contacts of relay B, conductor 21, conductor 22, conductor 48, No. 1 transfer contacts of relay RV2, conductor 29*b*, No. 1 contacts of relay RV1, winding of relay RV1 to negative battery.

In operating, relay RV1 closes a path from battery through relay B operated and relay OPP normal to place into the right-hand portion of the delay line the code to be reconstructed. The marks at the beginning of each digit start from fixed points in the register and are impressed on the register through varistors. The value of these digits relates to the selector level from which the trunk circuit was seized. This is indicated by operated relay SL1, through the contacts of which are connected the conductors to the varistors which mark digit locations in the shift register, as previously explained.

The marks placed into the shift register as a result of the operation of relay RV1 may be traced from battery 49, resistance 50, No. 7 contacts of relay B, conductor 51, No. 12 contacts of relay OPP, conductor 53, No. 3 contacts of relay RV1, conductor 54, varistors 31 and 55 to the selected No. 2 windings of the magnetic shift register.

In addition marks are placed in the No. 2 windings (not shown) of core 5B in section C1 and core 2B in section B1. The circuit for effecting this registration may be extended from the path previously traced to conductors 62, No. 3 contacts of relay SL1, conductor 25 to diodes 33 and 61. The insertion of this information in the shift register represents the reconstruction of the digits (five and two) dialed by the subscriber in reaching the tandem trunk.

In this embodiment, the cross-connections between relay SL1 and the shift register reproduce the original identity, in code, of the digits expended to reach the trunk. If the trunk had been seized at relay SL2, the digits to be reconstructed would be eight and seven as seen from the connection between sections B1 and C1 and the contacts of relay SL2.

*Outpulsing from shift register to tandem office*

The connection of the trunk at the tandem office to the sender and associated gas stepping tube receiver, initiates (by means not shown herein) a signal to the local office to begin outpulsing. This signal consists of removing the reversal of polarity on the trunk conductor leads to the tandem office. This second reversal of polarity releases relay CS over an obvious circuit, thereby completing a path for the operation of relay OPP from ground, No. 5 contacts of relay B, conductor 21, conductor 45, No. 1 contacts of relay CS, conductor 56, No. 7 contacts of relay RV2, conductor 57, No. 2 contacts of relay RV1, conductor 58, operating winding of relay OPP to negative battery. Relay OPP, in closing its contacts 5–9, connects together the two portions of the magnetic shift register in order that they may be used in cascade.

A locking path for relay OPP may be traced from ground at No. 5 contacts of relay B, conductor 21, conductor 22, conductor 48, No. 1 transfer contacts of relay RV2, No. 2 contacts of relay OPP, winding of relay OPP to negative battery.

If at the time of the operation of relay OPP, relay C is released, denoting an interdigital interval, a path is closed to operate relay PO from ground, No. 3 contacts of relay PI, No. 6 contacts of relay C, No. 3 contacts of relay D, No. 2 contacts of relay E, conductor 43, No. 10 contacts of relay OPP, conductor 59, No. 1 contacts of relay POH, conductor 60, No. 1 contacts of relay RS, No. 2 contacts of relay SP, winding of relay PO to negative battery.

Operation of relay PO inserts resistance 63 in the trunk loop to tandem through the opening of its No. 1 contacts. Relay PO in operating, also grounds conductor 39 over a path from ground, No. 3 contacts of relay PI, No. 6 contacts of relay C, No. 3 contacts of relay D, No. 2 contacts of relay E, conductor 43, No. 10 contacts of relay OPP, conductor 59, No. 4 contacts of relay PO, conductor 39 to the magnetic shift register.

Conductor 24 to the shift register is grounded during the release time of relay PO over a path from ground, No. 3 contacts of relay PI, No. 6 contacts of relay C, No. 3 contacts of relay D, No. 2 contacts of relay E, conductor 43, No. 10 contacts of relay OPP, conductor 59, No. 5 contacts of relay PO, to lead 24 to the magnetic shift register.

With relay C in the released condition, relay PO is in a self-interrupting circuit with relay POH to produce trunk voltage or impedance changes and shift register advance pulses which may, for example, be at the rate of 200 per second.

The operation of relay PO described above, completes a circuit for the operation of relay POH from ground, No. 5 contacts of relay B, conductor 21, conductor 22, No. 3 contacts of relay PO, through the winding of relay POH to negative battery. Operation of relay POH, through its No. 1 contacts opens the circuit which was previously holding relay PO operated, thereby releasing the latter relay. Release of relay PO through its No. 3 contacts opens the operating circuit for relay POH. The alternate opening and closure of these relays, in sequence, continues to produce shift register advance pulses in conductors 39 and 24 thereby advancing the information in the shift register as previously described.

When a mark in the magnetic shift register is driven from the last "B" core in section C1 a voltage is produced across coil 67 sufficient to ignite gas tube 68. At this time relay SP operates from ground through impedance 69, gas tube 68, to the operating winding of relay SP and negative battery. Relay SP, in operating, interrupts the trunk circuit to tandem by opening its No. 1 contacts, in series with tip conductor T. The operating circuit for relay RS is opened at the No. 3 contacts of relay SP. Release of relay RS extinguishes gas tube 68 by removing the positive potential on anode 70 previously applied through the No. 2 contacts of relay RS and impedance 72*c*.

The release of relay RS, in addition, prevents the reoperation of relay PO until relay SP has released and relay RS is reoperated.

In the above manner the digit begin and end pulses or gate opening and closing pulses are sent to the tandem office by open circuiting the trunk loop. During the interdigital interval, after receipt of the start pulsing signal from the tandem office, the shift register is cleared of information and although additional voltage pulses are continuously transmitted to tandem by the pulsing of relay PO, the last open pulse sent was a digit end or gate closing signal and consequently, the subsequent voltage pulses are disregarded as will be seen in the following explanation of the receiver.

Figures 2, 4A, 4B:
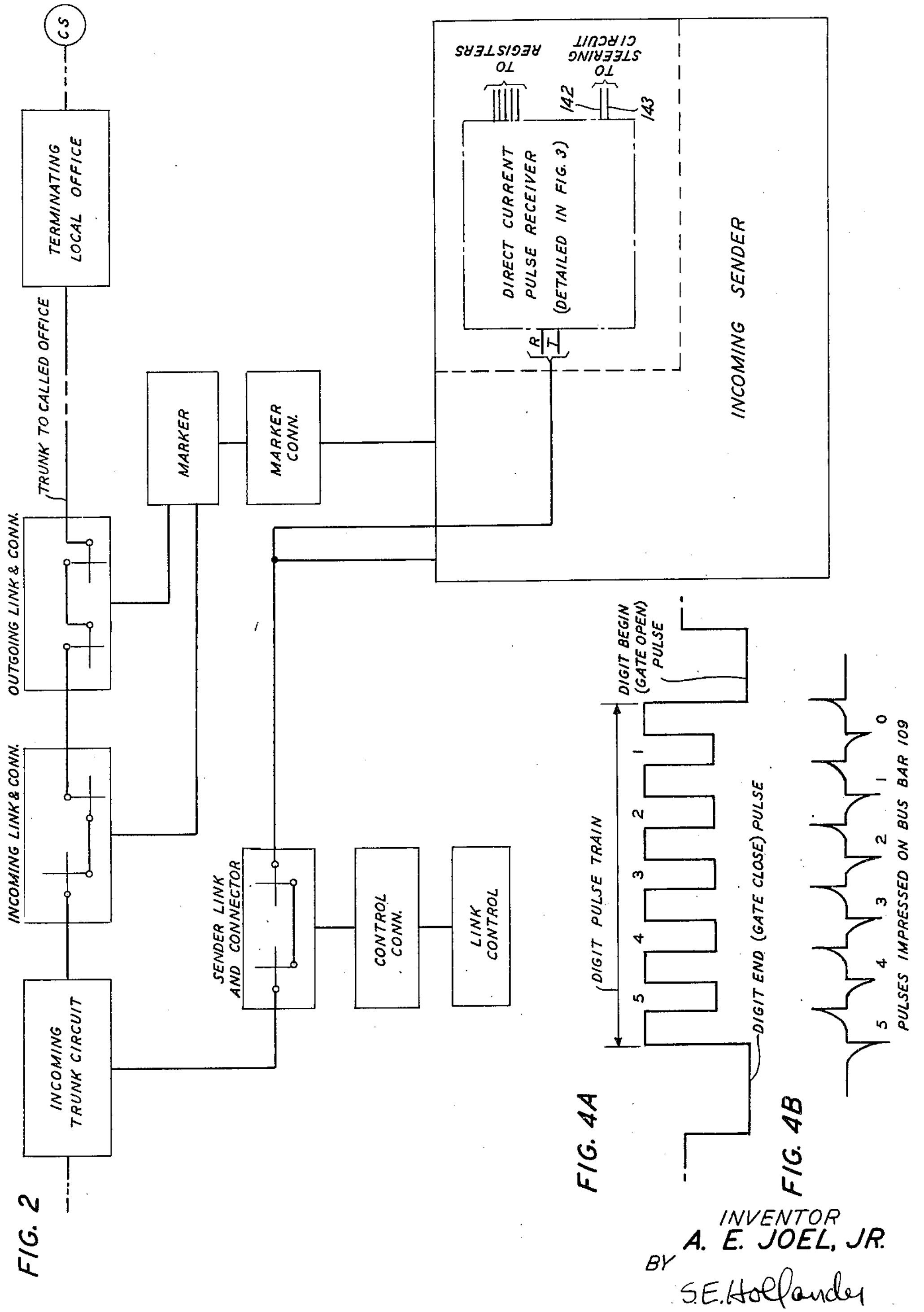
FIG. 2 is a block diagram of typical tandem office circuits and common control equipment which may be used in conjunction with the invention.
FIGS. 4A and 4B respectively illustrate the characteristic signal pattern of a typical digit as it appears on the trunk conductors to the tandem office and at the input of the receiving apparatus of FIG. 3.

As additional digits are dialed by the customer they are stored in the shift register as explained above and are cleared out through the tandem trunk to the incoming receiver at tandem on a high speed basis during the interdigital interval. The characteristic voltage signal pattern, for the digit five, as it appears on the trunk to the tandem office is shown in FIG. 4*a*.

*Reception of signals in gas stepping tube receiver at tandem office*

When relay PO operates at the local office and impedance 63 is inserted in series with the loop, relay GP (FIG. 3) releases, thereby releasing relay H at the No. 2 contacts of relay GP. Relay J remains operated at this time through the path previously traced. After the completion of the gate opening pulse, relay GP reoperates, when the current level is restored, over the circuit previously traced.

In consequence of the reoperation of relay GP, relay H' operates from ground, No. 2 contacts of relay GP, conductor 102, No. 2 contacts of relay H, conductor 104, No. 3 contacts of relay J, upper winding of relay H', conductor 105, upper operating winding of relay J to negative battery.

With relay H in the released condition and relay J in the operated condition, conductor 106 is no longer grounded at either the No. 1 contacts of relay H or the No. 4 contacts of relay J, thereby permitting the entrance of line pulses through the pulse repeat coil 107 and conductor 108 to bus bar 109. As each digit pulse (caused by the operation of relay PO) is received in the pulse repeat coils 90 and 91 and conveyed by induction to coil 107 and onto conductor 108 and bus bar 109, the discharge path in the gas stepping tube is moved along as a result of the geometry of the tube from one position to the next succeeding position, the location of the final discharge path thereby representing the number of pulses that have been impressed on bus bar 109, as shown graphically in FIG. 4B for the digit 5. It will be noted that each of the electrode positions has been triplicated in order that the cathodes A–, A–' of each of the decimal representations of the stepping tubes may be directly related to the two-out-of-five code designation of the decimal character represented. An analysis of the relationship between the decimal code and the two-out-of-five code may be found in a text entitled "The Design of Switching Circuits" by Keister, Ritchie and Washburn, 1951, at page 280.

When all of the pulses in a train representing a digit have been registered in the gas stepping tube, the line circuit is again momentarily opened by the operation of relay SP at the local office to provide a gate closing pulse, to which relay GP responds by opening its contacts. Relay J releases in consequence of the interruption of the previous holding circuit therefor at the No. 2 contacts of relay GP. The operating circuit for the lower operating winding of relay J was previously interrupted by the operation of relay H' and the opening of its No. 2 contacts.

Upon release of relay J, contacts 5 through 9 of said relay convey to message registers, including relays and associated indicating devices (not shown), the charges accumulated in the condensers designated generally as 111. Since the condensers have been energized due to the electrical discharges through the associated electrode paths, the information thus transferred represents the information periodically stored in the gas stepping tube. The No. 10 contacts of relay J momentarily short-circuit impedance 99 over a path from positive battery, contacts 98 of relay OND, conductor 121, No. 3 contacts of relay J', conductor 112, contacts 10 of relay J, conductor 113 to the anode of the gas stepping tube.

Relay H' does not release at this time since it is held operated through its lower winding from ground, No. 2 contacts of relay SR, No. 1 contacts of relay H', No. 1 contacts of relay J', lower winding of relay H' to negative battery. Relay H now reoperates from ground, contacts of relay ONC, No. 1 contacts of relay J, lower winding of relay H to negative battery. Operation of relay H again grounds conductor 106 through the No. 1 contacts of relay H, thereby shunting any transient signals which may appear in coil 107 and preventing their registration in the gas stepping tube.

After the conclusion of the gate closing pulse, and during the interdigital interval, relay GP again operates causing the operation of relay J' from ground, No. 2 contacts of relay GP, conductor 102, No. 3 contacts of relay H, conductor 129, No. 2 contacts of relay J, operating winding of relay J', conductor 110, No. 1 contacts of relay ON1 to negative battery. The operation of relay J' imposes a steep negative pulse on cathode N in the gas stepping tube over a path which includes ground, No. 2 contacts of relay J', resistance 114, condenser 115, No. 2 contacts of relay ON1, to cathode N. The potential on the plates of condenser 115 is rapidly shifted from somewhere near the potential of battery 116, which is at a relatively high positive potential, to somewhere near ground potential when the No. 2 contacts of relay J' are closed, thus imposing a sharp negative pulse on cathode N which serves to restore the discharge path to its initiating point at cathode N.

Relay H' now releases as a consequence of the opening of the No. 1 contacts of relay J'. At this time relay J reoperates from ground, No. 2 contacts of relay SR, No. 2 contacts of relay H', lower winding of relay J to negative battery. Relay J' releases as a result of the opening of the No. 2 contacts of relay J, restoring the circuit to the normal condition in readiness for the reception of the next train of pulses representing the next succeeding digit.

Sequential registration of a series of digits is effected by a steering circuit (not shown herein) under control of conductors 142 and 143.

*Release of trunk circuit at local office*

When the tandem office incoming sender has received all the required signals to complete the call it turns over the routing information for the call to a marker, which functions to complete a connection between the incoming trunk circuit and an outgoing trunk in the desired trunk group. In addition, the sender transmits a supervisory signal consisting of a trunk polarity reversal back to the local office outgoing trunk. The signal operates relay CS in the outgoing trunk which in turn completes a path for the operation of relay RV2. This path may be traced from ground, No. 5 contacts of relay B, conductor 21, conductor 45, No. 2 contacts of relay CS, conductor 46, No. 3 contacts of relay OPP, conductor 71, conductor **72*b*, No. 3 transfer contacts of relay RV2 to the winding of relay RV2 and negative battery. Relay RV2 locks operated over its No. 4 contacts, and conductors 48, 22 and 21** to the No. 5 contacts of relay B. Removal of the trunk polarity reversal releases relay CS in the trunk circuit, at which time relays RV1 and OPP are released by virtue of the opening of the No. 1 transfer contacts of relay RV2 and the release of relay CS.

At the termination of the call, relay A releases operating relays PI and C over paths previously traced. Release of relay A results in the opening of the operating circuit for relay B, which relay, upon release, in turn causes the release of relays TK, SL, RS and RV2, all of which have been held operated through the contacts of relay B. Relays TK and SL1 are released as a result of the opening of the No. 1 contacts of relay B. Relay RS is released through the opening of the No. 5 contacts of relay B and relay RV2 is similarly released by the opening of the same contacts. Relay C releases in consequence of the opening of No. 3 contacts of relay B. During the release of relay C leads 24 and 39 of the shift register are simultaneously grounded to clear out any control pulses which may be recorded therein over a path which may be traced from ground, No. 2 contacts of relay PI, No. 5 contacts of relay C, conductor 32, to lead 24 and from ground, No. 6 contacts of relay B, No. 2 contacts of relay C, conductor **72*a* to conductor 39**.

It is understood that the embodiment of the invention described above is exemplary only, it being obvious to those skilled in the art that various changes and modifications may be made therein without departing from the scope and spirit of the invention.

What is claimed is:

1. In a telephone system, a calling line, outgoing trunks, means responsive to the transmission of coded information over said calling line for extending a connection from said line over one of said trunks, shift register storage means connectable to said trunk and to said line for storage and transmission of said coded information therebetween, signaling means connected to said trunk and under control of said shift register for outpulsing the information stored in said shift register means over said trunk, and means for varying the rate of advance of said information through said shift register.

2. In a telephone switching system, a calling line, a plurality of trunks over any one of which connections may be extended to a distant office, selector switches responsive to the transmission of code signals for extending a connection from said calling line to one of said trunks, shift register storage means responsive to said code signals and having storage capacity for said code signals and for an additional signal transmitted to said trunk, and signaling means under control of said shift register for outpulsing information over said trunk in accordance with said code signals and said additional signal, said shift register storage means including means to advance the signals stored in said shift register at a relatively rapid rate during particular intervals and at a slower rate during other intervals.

3. In a telephone switching system, a subscriber's line including signaling means, a plurality of trunks, selector switches responsive to code digit signals over said line for extending a connection from said line to seize one of said trunks, means for reconstructing said code digits, shift register storage means responsive to said signals over said line and operable to store said reconstructed code digits and an additional digit transmitted to said trunk after seizure thereof, outpulsing means responsive to the operation of said shift register for outpulsing over said one trunk the digits stored in said shift register and digits subsequently transmitted over said line, means for advancing the digits in said shift register at a relatively rapid rate during particular intervals and at a slower rate during other intervals, and self-interrupting means included in said outpulsing means for producing impedance changes on said trunk.

4. In an automatic telephone system, a calling line including signaling means, a plurality of trunks over any one of which connections may be extended, selector means responsive to the transmission of code digit signals for extending a connection from said calling line to seize one of said trunks, means for reconstructing said code digits dialed in reaching said trunk, shift register storage means responsive to said transmission of said digits and including storage capacity for said reconstructed code digits and for an additional digit transmitted to said trunk after seizure thereof, said shift register storage means having two separable groups of stages, means for storing said reconstructed code digits in one of said groups of stages, means for storing said additional digit transmitted to said trunk in the other of said groups, outpulsing means including a pulsing device for producing a series of trunk voltage changes in accordance with the digits stored in said shift register, means controlled by said outpulsing means and shift register storage means to advance the information in said shift register at a relatively rapid rate during interdigital intervals and at a slower rate during digital transmission, and means responsive to the advance of information in said shift register for impressing open circuit gating pulses on said trunk before and after the production of each series of trunk voltage changes.

5. In a telephone switching system, a calling line including dial signaling means, a plurality of trunks over any one of which connections may be extended, step-by-step selector devices for extending said calling line to seize one of said trunks in response to direct-current code signals dialed into said calling line, means for reconstructing said direct-current code signals, shift register storage means responsive to said dialed signals having storage capacity for said reconstructed code signals and for an additional signal dialed into said trunk after seizure thereof, said shift register including two separable groups of stages, means for storing said reconstructed code signals in a terminal group of said stages, means for storing said additional signal dialed into said trunk in an initial group of said stages, means for connecting said initial group and terminal group in cascade, and outpulsing means for outpulsing the information stored in said shift register whereby said signals stored in said shift register are advanced at a relatively rapid rate between dialing intervals and at a less rapid rate during dialing periods.

6. In a telephone switching system, a calling line, a distant office, a plurality of trunks over any one of which connections may be extended to said distant office, selector means responsive to the dialing of code digits to extend a connection from said calling line to one of said trunks, shift register storage means connectable to said trunk and to said calling line for storage and transmission of code digits therebetween, signaling means connected to said trunk and to said shift register for outpulsing the digits stored in said shift register over said trunk to said distant office, means under control of said shift register for impressing gating signals on said trunk to said distant office, said gating signals preceding and following the outpulsing of said digits, a pulse receiving circuit at said distant office comprising a multicathode gas discharge tube having a plurality of distinct conductive positions, said tube being operative to advance the conductive condition therein in response to said digits outpulsed over said trunk by said high speed direct-current signaling means, means responsive to the reception of a first of said gating signals conducted over said trunk to render said discharge tube operative, means responsive to the reception of a second of said gating signals conducted over said trunk to render said discharge tube inoperative, registration means connected to the cathodes of said discharge tube, and additional means responsive to the reception of said second gating signal for selectively actuating said registration means in accordance with the number of positions advanced.

7. In an automatic telephone system, a calling line, a distant office, a plurality of trunks over any one of which connections may be extended to said distant office, selector means under the control of said calling line for establishing a connection from said line to an idle one of said trunks, said selector means being responsive to decimal direct-current code signals dialed into said line by a calling subscriber, means for reconstructing said decimal direct-current code signals, shift register storage means responsive to said dialing signals and having storage capacity for said direct-current code signals and for a signal dialed into said line after connection to said trunk, signaling means under control of said shift register for outpulsing decimal signals over said trunk in accordance with said dialed code signals, said shift register storage means including means to advance the signals stored in said shift register at a relatively rapid rate during particular intervals and at a slower rate during other intervals, means under control of said shift register for impressing gating signals on said trunk to said distant office, said gating signals preceding and following the outpulsing of said digits, a gas discharge stepping tube receiver at said distant office having a plurality of distinct conductive positions connected to said trunk at said distant office, said tube being operative to advance the conductive position therein in response to said decimal signals outpulsed under control of said shift register, means responsive to the reception of a first of said gating signals conducted over said trunk circuit to render said discharge tube operative, means responsive to the reception of a second of said gating signals conducted over said trunk circuit to render said discharge tube inoperative, registration means connected to the cathodes of said discharge tube, and additional means responsive to the reception of said second gating signal for selectively actuating said registration means in accordance with the number of positions advanced.

8. In an automatic telephone system, a calling line including dialing means, a distant office, a plurality of trunks over any one of which connections may be extended to said distant office, selector means responsive to the dialing of code digits over said calling line for extending a connection from said line to seize one of said trunks, means for reconstructing said code digits dialed in reaching said trunk, shift register storage means responsive to said dialing and including storage capacity for said reconstructed code digits and for an additional digit dialed into said trunk after seizure thereof, said shift register storage means having two separable groups of stages, means for storing said reconstructed code digits in one of said groups of stages, means for storing said additional digit dialed into said trunk in the other of said groups, signaling means including a pulsing device for producing trunk impedance changes in accordance with the digits stored in said shift register, means for advancing the information in said shift register at a relatively rapid rate during interdigital intervals and at dial pulse rate during dialing periods, means responsive to the advance of information in said shift register for impressing predetermined open circuit gating pulses on said trunk, a gas discharge stepping tube receiver at said distant office having a plurality of distinct conductive positions, said tube being operative to advance the conductive position therein in response to said trunk impedance changes produced by said pulsing device, means responsive to the reception of a first open circuit gating pulse impressed on said trunk to render said discharge tube operative, means responsive to the reception of a second open circuit gating pulse impressed on said trunk for rendering said discharge tube inoperative, means connected to said last-mentioned responsive means for preventing trunk impedance changes from advancing the conductive position in said discharge tube, registration means connected to the cathodes of said discharge tubes, and additional means responsive to the reception of said second open circuit gating pulse for selectively actuating said registration means in accordance with the number of positions advanced.

9. In an automatic step-by-step telephone office, a calling line including dialing means, a distant office, a plurality of trunks over any one of which connections may be extended to said distant office, selector switches responsive to direct-current dialing signals over said calling line for extending a connection from said calling line to one of said plurality of trunks, means for reconstructing said direct-current signals dialed to reach said trunk, magnetic shift register storage means responsive to said dialing signals and including storage capacity for said reconstructed code digits and for an additional digit dialed into said trunk after connection of said calling line thereto, said shift register storage means having two separable groups of stages, means for storing said reconstructed dialing signals in one of said groups of stages, means for storing said additional digit dialed into said trunk in the othei of said groups, signaling means including a pulsing relay and impedance means for producing trunk voltage changes in accordance with the digits stored in said shift register by periodically shunting said impedance means, means for advancing the information stored in said shift register at a relatively rapid rate during interdigital intervals and at dial pulse rate during dialing periods, trunk circuit interrupting means for open circuiting said trunk loop to said distant office, means responsive to the advance of information in said shift register for energizing said trunk circuit interrupting means, said interrupting means and said pulsing relay coacting under control of said shift register to produce a series of voltage changes on said trunk in accordance with the information stored in said shift register, a gas discharge stepping tube receiver at said distant office having a plurality of distinct conductive positions, said tube being operative to advance the conductive position therein in response to said trunk voltage changes produced by said pulsing relay, relay means responsive to the operation of said trunk circuit interrupting means at said local office to render said gas stepping tube operative, means responsive to the subsequent operation of said trunk circuit interrupting means for rendering said discharge tube inoperative, means connected to said last-mentioned responsive means for neutralizing trunk voltage changes during predetermined intervals, a plurality of resistance capacitance networks connected to the cathodes of said discharge tube, registration means connected to said resistance capacitance networks, and additional means responsive to the operation of said trunk circuit interrupting means for selectively actuating said registration means in accordance with the number of positions advanced.

10. Shift register storage means for storage of coded digital signals including a plurality of stages adapted to store said signals, and control means connected to said shift register for advancing said signals through each stage of said shift register from an initial stage of said shift register to a terminal stage of said shift register, said control means including means for adjusting the rate of advance to at least two distinct predetermined rates.

11. Shift register means for storage of coded signals including two separable groups of stages, means for independently storing information in each of said groups of stages, a signaling source connected to one of said stages, means in said shift register responsive to the reception of signals from said signaling source for storing said signals, and means connected to said shift register for advancing the signals stored in said shift register at varying rates.

12. A shift register including storage means, signaling means connectable to said shift register, said shift register including at least two separable groups of stages for storage of signals from said signaling means, means connected to said shift register for coupling said shift register stages in cascade, and means connected to said shift register for advancing the signals stored therein at a relatively rapid rate in the absence of signals from said signaling means and at a less rapid rate during the reception of signals from said signaling means.

13. A shift register including a plurality of stages, signaling means connected to one of said stages, means for storing information representing code digits in each of said stages, switching means for connecting and disconnecting said stages in tandem, each of said stages including saturable magnetic cores, means in said shift register responsive to signals from said signaling means for advancing the code digits in said shift register from a preceding stage to a succeeding stage at the rate at which said signals are received in said one stage, interrupting means, and means for transferring said digits from a preceding stage to a succeeding stage at a rate determined by said interrupting means.

14. In a telephone system, a telephone line, shift register storage means connectable to said line for storage of coded information transmitted over said line, signaling means under control of said shift register for transmitting the information stored in said shift register, and means connected to said shift register for varying the rate of advance of said information through said shift register.

15. A telephone system in accordance with claim 14, wherein said means for varying the rate of advance of said information includes means for advancing said information at a relatively rapid rate during particular intervals and at a slower rate during other intervals.

References Cited in the file of this patent

UNITED STATES PATENTS

| | | |
|---|---|---|
| 2,730,568 | Reagan | Sept. 27, 1952 |
| 2,764,634 | Brooks et al. | Sept. 25, 1956 |
| 2,767,248 | Warman | Oct. 16, 1956 |